May 19, 1959  J. C. HELSEL, SR  2,887,342

TRACK TENSION ADJUSTER

Filed May 8, 1956

Inventor
Joseph C. Helsel, Sr.
By B. F. Garvey
ATTY.

United States Patent Office 2,887,342
Patented May 19, 1959

2,887,342
TRACK TENSION ADJUSTER
Joseph C. Helsel, Sr., Philipsburg, Pa.
Application May 8, 1956, Serial No. 583,548
5 Claims. (Cl. 305—9)

This invention relates to a tension adjuster for an endless link track, particularly adapted for attachment to a conventional bulldozer and is a continuation-in-part of application Serial Number 503,751 filed by me April 25, 1955, now abandoned.

Further experimentation under actual working conditions with the track tension adjuster forming the subject matter of Serial Number 503,751 has revealed that, although this unit is satisfactory for normal bulldozer operations, nevertheless it is, in certain instances, unable to withstand the tremendous pressure exerted thereon by the lubricant used to counter pressure one end of the adjuster's floating piston. As an example, when a bulldozer equipped with track tension adjusters of the present type heretofore used runs into a high wall, the pressure exerted on the grease fittings by the lubricant is so great that these fittings are frequently blown out. Also, under this pressure, a single conventional piston cup is inadequate to prevent the leakage of grease between it and the side wall of the cylinder.

It is an object of this invention to provide a simplified track tension adjuster for link track vehicles comprising a minimum of parts, which adjuster is automatically responsive to varying stresses placed on the tracks, yet at all times maintains a predetermined tension thereon sufficient to prevent the tracks from slipping off the sprocket, means being provided for protecting and insuring the proper operation of the adjuster's component parts under pressures created by the lubricant within the unit.

Another object is to effect adjustment of a track by the strategic positioning of a floating piston, spring-loaded at one end and constantly counter-pressured at its opposite end by a non-fluid lubricant, to maintain a predetermined delicate balance for automatic retention of the track at a tautness to positively prevent casual displacement of the track.

A further object is to provide a track tension adjuster of the character described, in which the floating piston is provided with a plurality of sealing members capable of withstanding any pressure exerted thereon by the lubricant, and safety check means to prevent application of pressure to the lubricant fitting.

Other objects of the invention will be manifest from the following description of the present preferred form of the invention, taken in connection with the accompanying drawings, wherein.

Figure 1:
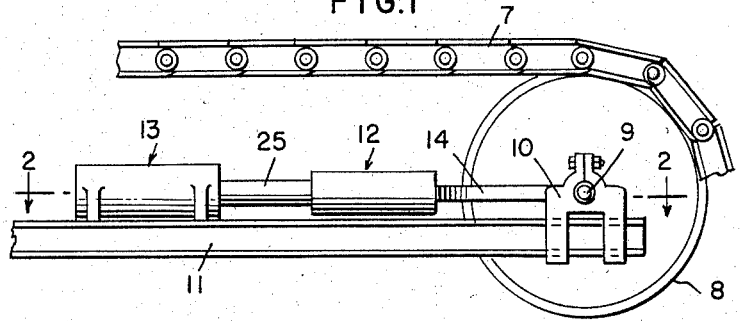
Fig. 1 is a fragmentary side elevational view of a bulldozer illustrating the application of the present invention thereto.
Figure 2:
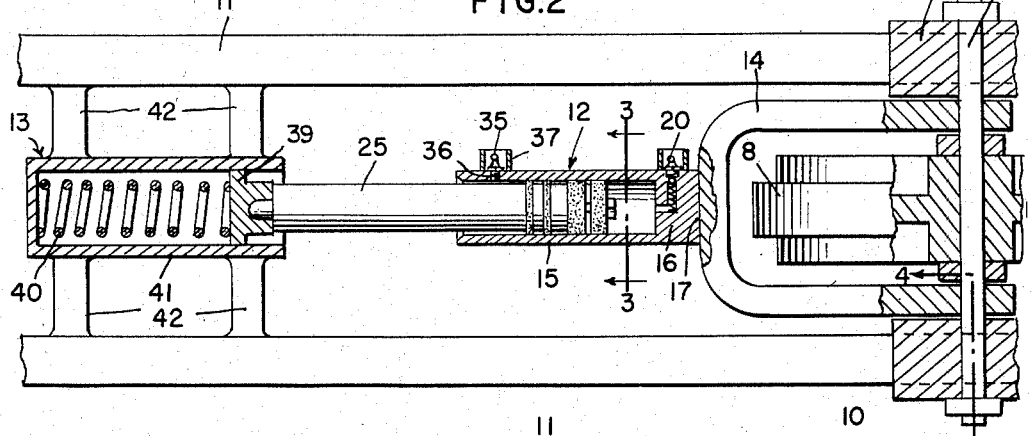
Fig. 2 is a longitudinal sectional view, taken along the lines 2—2 of Fig. 1, looking in the direction of the arrows, parts thereof being shown in elevation.
Figure 5:
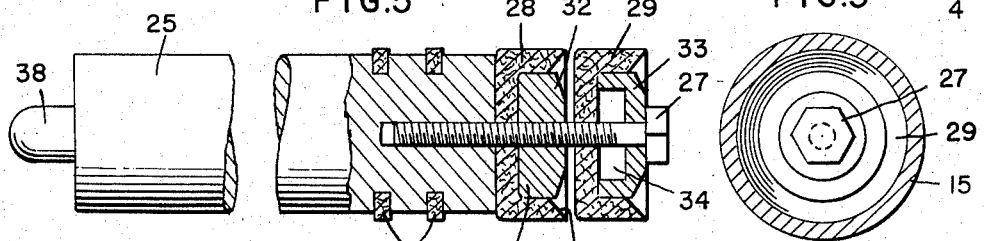
Fig. 5 is an enlarged elevational view, partly in section, of a floating piston forming a part of the present invention.
Figure 3:
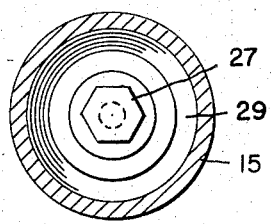
Fig. 3 is a sectional view taken along the lines 3—3 of Fig. 2 looking in the direction of the arrows.
Figure 4:
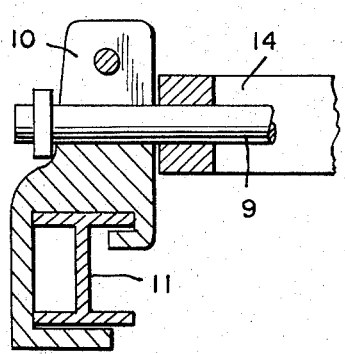
Fig. 4 is a sectional view taken along the lines 4—4 of Fig. 2.

Referring now in greater detail to the drawing, there is fragmentarily shown in Fig. 1, a bulldozer of conventional construction, each side of which is provided with an endless link track 7, operatively engaged with an idler wheel 8. Idler wheel 8 is rotatably mounted on an axle 9 journaled at each end in front idler boxings 10 which are slidably mounted on frame members 11.

To accomplish the objects of the present invention, there is provided a piston and cylinder assembly generally designated 12, one end of which is connected to a spring unit 13, the other end thereof being engaged with a horseshoe bracket 14. The terminals of horseshoe bracket 14 are in turn, secured in any suitable fashion to slidable idler boxings 10.

Figure 6:
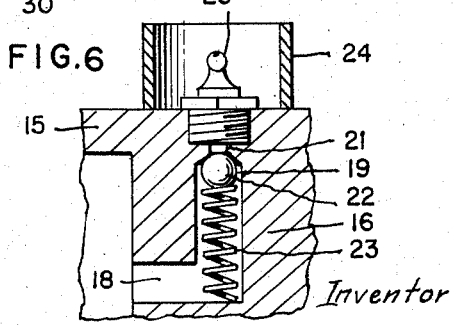
Fig. 6 is an enlarged fragmentary sectional view of the lubricant cylinder showing to advantage the grease fitting and safety check valve therefor, forming a part of the present invention.

Assembly 12 includes a cylinder 15 one end of which is open and the other end designated 16 closed and fixedly secured at 17, to the cross member of horseshoe bracket 14. End 16 is provided with a horizontal duct 18 leading from cylinder 15 and communicating with a vertical duct 19. As shown to advantage in Fig. 6, a grease fitting 20 of conventional construction is detachably mounted in end 16 and communicates with duct 19 through a restricted passage 21. To prevent grease fitting 20 from being blown out under pressure exerted thereon by lubricant within cylinder 15, there is provided a safety check valve positioned in vertical duct 19. This check valve includes a ball 22 normally retained at the upper limit of duct 19 in sealing relation with respect to restricted passage 21 by a coil spring 23. Ball 22 moves downwardly against the tension of spring 23 upon admission of lubricant through grease fitting 20. A cylindrical guard 24 for grease fitting 20 prevents the grease fitting from becoming broken by rocks and/or dirt.

Assembly 12 also includes a piston rod 25, the inner end of which is provided with a pair of spaced peripheral grooves adapted for the reception of compression piston rings 26, the function of which will be hereinafter set out. Attached to the end of piston rod 25 by means of a screw 27, are a pair of piston cups 28 and 29 constructed of any suitable flexible material. The flanged portion of cup 28 is tapered as indicated at 30. Piston cup 28 is held in proper position by a follow plate 31, the outer face of which is tapered at an angle of approximately 15°, as indicated at 32. Piston cup 29 is held in proper position by a follow plate 33, the inside of which is counter-bored, as indicated at 34. By means of this structure, when screw 27 is drawn up, the face of piston cup 29 adjacent follow plate 31 is forced by counter-bored follow plate 33 against tapered face 32 of follow plate 31. This causes piston cup 29 to expand into tighter engagement with the inside wall of cylinder 15. Cup 29, in turn, exerts an outward force on tapered portion 30 of piston cup 28 to urge the latter into tighter engagement with the inner wall of cylinder 15. This effects a positive seal against any pressure and also serves as a pressure point for the lubricating grease to collect and force the piston to travel toward the open end of cylinder 15. The sealing action of piston cups 28 and 29 is backed up by compression piston rings 26.

For lubricating piston 25, cylinder 15 is provided, at a point near the open end thereof, with a second grease fitting 35 in communication with piston 25 through passageway 36. A cylindrical guard for grease fitting 35 is indicated at 37. Grease fitting 35 also serves to force out any foreign matter which has collected between the piston and the cylinder walls.

The free end of piston 25 is provided with a protuberance or knob 38 adapted to be received, in a complementary opening of a spring block 39 which forms a part of spring unit 13. Affixed to spring block 39 is a heavy compression spring 40, the spring block and spring being located within a housing 41 secured to frame members 11 by braces 42.

In operation, idler wheel 8 is normally held in position by the force of compression spring 40 and cylinder and piston assembly 12, acting through horseshoe bracket 14. In the event that link track 7 becomes loose from wear, floating piston 25 may be moved longitudinally in cylinder 15 to effect movement of idler 8 in a direction to take up the slack in link track 7. Movement of piston 25 is effected by injecting grease, under pressure, through grease fitting 20 through passageway 21 and ducts 19 and 18, into cylinder 15. The pressure of the grease against the piston head forces the latter to move in the above-described manner to effect the desired tautness of the link track. For introducing the grease into the cylinder, an ordinary grease gun furnished, as a rule, by the bulldozer manufacturer, for lubricating the moving parts thereof, is used.

After the desired tension has been placed on the link track, spring 40 serves to maintain the proper tension thereon by automatically responding to changes in the terrain over which the bulldozer travels, thereby eliminating excessive stress on the link track. For example, when too much tension is placed on track 7, a force is exerted through idler 8, horseshoe bracket 14 and cylinder and piston assembly 12 to spring block 39. Block 39 in turn, moves longitudinally of housing 41 to compress spring 40.

It will be apparent from the above that assembly 12 and spring unit 13, when constructed, arranged and connected as above set out, provides a floating connection between the tractor and the idler wheel, to provide the delicate adjustment necessary to maintain snug engagement of the tracks with their wheels, to prevent casual displacement of the tracks due to slack. The further provision of a pair of piston cups 28 and 29 which, in conjunction with compression piston rings 26 effectively seal cylinder 15 to prevent leakage of the lubricant even under very high pressure to which these parts are, at times, subjected; enhances the adjuster's value.

It has been found that by using lubricating grease instead of oil to effect movement of piston 25 and cylinder 15, the following advantages result: (1) it permits tightening of the link track with an inexpensive grease gun furnished by the manufacturer for lubricating the working parts of the pulldozer; (2) it requires only a small amount of lubricating grease to effect movement of the floating piston, making it more economical than oil; and (3) it prevents leakage in the cylinder which has proven to be a shortcoming of a system using oil.

While the present invention has been shown and described in its preferred form, it is nevertheless to be understood that various changes may be made therein, within the scope of the claims hereto appended.

What I claim is:

1. A track tension adjuster for a link track vehicle including a piston floatingly mounted on the vehicle body, one end of the piston being operatively connected in a spring-loaded cylinder mounted on a fixed part of said vehicle, and a lubricant cylinder in which the opposite end of the piston is mounted, for holding the piston in a predetermined state of balance, said cylinder being fixed to and adapted to actuate a movable part of the vehicle operatively connected to the link track for exerting tension on the latter.

2. In combination with a bulldozer including a link track, means for maintaining a constant pressure on the track to prevent casual displacement, including a piston floatingly mounted on the bulldozer body, one end of the piston being operatively mounted in a spring loaded cylinder, a lubricant cylinder in which the opposite end of the piston is mounted, for holding the piston in a predetermined state of balance, a plurality of sealing members carried by the opposite end of the piston for preventing leakage of lubricant, and means engaged with said sealing members for urging the latter into sealing engagement with the cylinder wall.

3. In combination with a bulldozer including a link track, means for maintaining a constant pressure on the track to prevent casual displacement including a piston floatingly mounted on the bulldozer body, one end of the piston being operatively mounted in a spring loaded cylinder, a lubricant cylinder in which the opposite end of the piston is mounted for holding the piston in a predetermined state of balance, a fitting mounted in said cylinder for effecting admission of lubricant to the cylinder and safety check means beneath said fitting to prevent the exertion of pressure thereon by the lubricant.

4. In combination with a bulldozer including a link track, means for maintaining a constant pressure on the track to prevent casual displacement, including a piston floatingly mounted on the bulldozer body, one end of the piston being operatively mounted in a spring-loaded cylinder, a lubricant cylinder in which the opposite end of the piston is mounted to hold the piston in a predetermined state of balance, and sealing members carried by the opposite end of the piston for preventing leakage of the lubricant, said sealing members including a flexible cup secured to the terminal of the piston having a flanged portion and means engageable with the flanged portion of said cup for urging the latter into sealing engagement with the cylinder wall.

5. A track tension adjuster for a link track vehicle including a piston floatingly mounted on the vehicle body, one end of the piston being operatively connected in a spring-loaded cylinder mounted on a fixed part of said vehicle, a lubricant cylinder in which the opposite end of the piston is mounted, for holding the piston in a predetermined state of balance, said cylinder being fixed to and adapted for actuating a movable part of the vehicle operatively connected to the link track for exerting tension on the latter, and a plurality of sealing members carried by the opposite end of the piston for preventing leakage of lubricant, said sealing members including flexible cups having flanged portions, one of which cups is adapted to receive a follow plate having a beveled face engageable with the said other cup, the sealing members further including adjustable means connecting said cups and follow plate to the terminal of the piston and for urging the one cup into engagement with the beveled face of said follow plate and with the flanged portion of the other cup to effect expansion of the flanged portions of both cups into sealing engagement with the cylinder wall.

References Cited in the file of this patent

UNITED STATES PATENTS

| | | |
|---|---|---|
| 2,322,977 | Schroder et al. | June 29, 1943 |
| 2,677,238 | Greer | May 4, 1954 |
| 2,683,064 | Land | July 6, 1954 |
| 2,697,641 | Henderson | Mar. 6, 1956 |